United States Patent [19]

Gregory et al.

[11] Patent Number: 4,715,683

[45] Date of Patent: Dec. 29, 1987

[54] MODIFIED LIQUID CRYSTAL TELEVISION AS A SPATIAL LIGHT MODULATOR

[75] Inventors: Don A. Gregory, Huntsville, Ala.; Bob D. Guenther, Cary, N.C.

[73] Assignee: The United States of America as represented by the Secretary of the Army, Washington, D.C.

[21] Appl. No.: 928,492

[22] Filed: Nov. 10, 1986

[51] Int. Cl.⁴ .................... G02F 1/13; G03H 1/08; G02B 5/32
[52] U.S. Cl. .................... 350/331 R; 350/3.66; 350/3.74; 350/337; 350/345
[58] Field of Search ............... 350/331 R, 347 E, 345, 350/3.66, 3.67, 3.77, 337, 3.74

[56] References Cited

U.S. PATENT DOCUMENTS

| | | | |
|---|---|---|---|
| 3,829,838 | 8/1974 | Lewis et al. | 350/3.66 X |
| 3,890,035 | 6/1975 | Takeda | 350/3.66 X |
| 3,924,924 | 12/1975 | Fukuhara | 350/3.74 |
| 4,533,215 | 8/1985 | Trias et al. | 350/345 X |
| 4,562,478 | 12/1985 | Hirasawa et al. | 350/345 X |
| 4,653,867 | 3/1987 | Urabe et al. | 350/345 X |

FOREIGN PATENT DOCUMENTS 2000290  1/1979  United Kingdom ............... 350/3.74

OTHER PUBLICATIONS

Robert, J., "T.V. Image with Liquid Crystal Display," 1978 Biennial Display Research Conference, (Oct. 1978), pp. 52-55.

Primary Examiner—Stanley D. Miller
Assistant Examiner—Richard F. Gallivan
Attorney, Agent, or Firm—Freddie M. Bush; Robert C. Sims

[57] ABSTRACT

The spatial light modulator utilizes a modified liquid crystal television for modulating a laser beam so as to produce a transformed hologram image on a film plate which is identical with the video information being fed into the liquid crystal TV. Once a image film has been produced the film is developed and placed back in the system so that the system will now act as a comparator and tracking device. With the reference beam blocked and a new video input fed into the liquid crystal TV the system now will have an output only when the scene on the TV is identical to the scene recorded on the film. Indicator means give a signal output from this comparison that is identical.

4 Claims, 7 Drawing Figures

MODIFIED LIQUID CRYSTAL TELEVISION AS A SPATIAL LIGHT MODULATOR

DEDICATORY CLAUSE

The invention described herein may be manufactured, used, and licensed by or for the Government for governmental purposes without the payment to us of any royalties thereon.

BACKGROUND OF THE INVENTION

The recent availability of inexpensive liquid crystal televisions has led to experimenting with these devices as coherent spatial light modulators. The basic principle behind the operation of the Liquid Crystal Television (LCTV) is somewhat similar to that of the Hughes Liquid Crystal Light Valve (LCLV) which have been used for some time as incoherent to coherent image converters in real-time pattern recognition systems. The 90° twisted nematic liquid crystal structure is common to both the LCTV and the transmission type LCLV. A major difference in the two devices is the method of addressing. The LCLV is optically addressed (with coherent or incoherent light), while the LCTV must be electrically addressed. Both techniques have their advantages.

SUMMARY OF THE INVENTION

The basic experimental setup is shown in FIG. 3. This is similar to a standard Vander Lugt optical correlator used in many optical data processing experiments—except for the addition of the LCTV and associated elements. A prefiltering aperture is included to remove the high spatial frequencies associated with the pixel grid structure of the LCTV. FIG. 2 is a photograph of the optical Fourier transform of the unfiltered LCTV screen. The lens used to perform the transform had a focal length of 876 mm. It is obvious from this photograph that any matched filter made with the LCTV will be entirely dominated by the spectrum of the electrode grid structure. In order to minimize this effect, pinholes, ranging in diameter from 0.5 mm to 1 mm are incorporated into a prefiltering arrangement which has proven to be quite effective in removing the higher spatial frequencies. Of course this technique may also remove higher frequencies contained in the image displayed on the LCTV. The combination of focal lengths and pinholes size can be chosen to minimize this problem. Initially, the focal lengths of $L_2$, $L_3$, and $L_4$, shown in FIG. 3, were chosen to be 178 mm, 200 mm, and 381 mm respectively. The LCTV may also be used as the input to matched filters made using other modulators. The prefiltering arrangement would then not be necessary.

The LCTV was addressed using the video input plug provided on the device and a remote video camera. The standard television antenna also allows the option of RF addressing from an external transmitter. The LCTV may also be used as a monitor for most small computers. This allows computer generated images to be used to make and/or address the Fourier transform matched filters.

DETAILED DESCRIPTION OF THE PREFERRED EMBODIMENT AND THE BEST MODE

Figure 1:
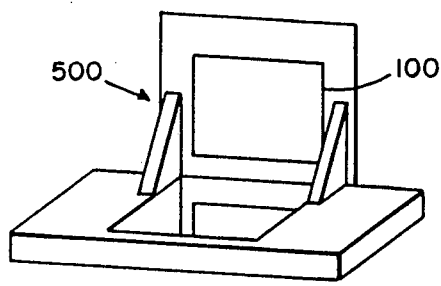
FIG. 1 is a showing of the modified liquid crystal television.
Figure 2:
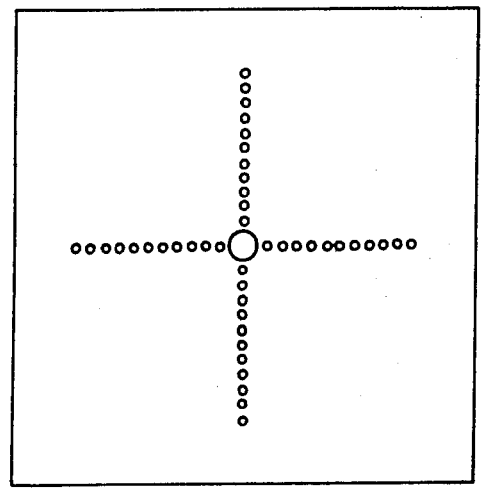
FIG. 2 is a showing of the optical Fourier transform of the pixel structure of the liquid crystal television.

One LCTV, (Citizen, model 03TA-OA), has been modified by the removal of the poor quality parallel polarizers attached to both sides of the liquid crystal-/electrode grid sandwich. The light diffuser was also removed and the screen hinge modified so that the screen could be positioned vertical as opposed to the designed, approximately 45°, viewing position. FIG. 1 is a showing of the LCTV 500 with the structural modifications made.

The electrode grid addressing structure produces an array of 148 horizontal pixels by 122 vertical pixels. The pixel size is approximately 0.22 mm×0.37 mm. The power consumption of the LCTV is 0.4 watts. The device can be operated on four AAA batteries for up to 10 hours. An AC adapter was also available for continuous operation. The dimensions of the LCTV, with the liquid crystal screen folded down, are 6.5 mm×13.5 mm×2.4 mm, and the weight is about 9 ounces including batteries.

The LCTV was observed to work reasonably well as a normal television set. The resolution was poorer than most standard televisions, but the grey levels and the TV frame rate speed of the device were reasonably acceptable to the eye.

A DESCRIPTION OF FIG. 3

1. The laser source 1 is a linearly polarized Helium Neon operating at 632 nm. SH is a shutter which allows variable exposure times.

2. S is a spatial filter which consists of a microscope objective 2 and a pinhole 3. This serves to expand the very small beam coming from the laser.

3. Lens L1 collimates the expanded beam-making a beam that does not spread and that has a constant intensity across its area. The beam is about 2¼ inches in diameter now.

4. M1 is a flat first surface silvered mirror.

5. The ¼ plate - also called a quarter wave plate is put into the beam so that in conjunction with other polarizers in the system, we can get any polarization state we want. This is necessary in order to get the best image from laser light shined through the LCTV.

6. BS is a beamsplitter which is a slightly silvered flat glass plate which reflects some of the incident light and transmits some.

7. The transmitted light through the BS becomes the reference beam which will be used at the film plate F. M3 is a mirror. P3 and P4 are polarizers which determine the polarization angle as well as the intensity which arrives at the film plate F. An iris 110 is used to decrease the diameter of this reference beam.

8. The beam block 50 can be placed anywhere in the reference beam. This is used to block the reference beam after the matched filter has been made.

9. The laser light that was reflected from the beamsplitter BS travels to a mirror M2 and is reflected back to the BS, and a portion is transmitted through to P1. The purpose of this extra mirror M2 is to provide an adjustable path (M2 is movable nearer to and further from the BS). It is important for the path lengths of the reference beam and the object beam to be equal.

10. The light traveling toward P1 is the object beam.

11. P1 is a polarizer. Its function is to provide a final adjustment of the polarization angle before the beam enters the LCTV.

12. A target image has been fed into the LCTV from an external source 59 such as a TV camera, computer, or RF transmitter and is displayed on the vertical screen 100. Its image is designed to be located in the center of the screen (or at a predetermined location thereon).

13. The LCTV has been modified as discussed above.

14. As the laser beam is transmitted through the LCTV screen 100, it becomes polarization modulated corresponding to the displayed image. The resulting beam emerging from the LCTV screen has the displayed image encoded on it as a polarization modulation across the wavefront. This is very similar to the operation of the Hughes liquid crystal light valve.

15. Polarizer P2 converts the polarization encoded image back into an intensity (ordinary) image. P2 is not absolutely necessary.

16. The combination of lens L2, pinhole PH, and lens L3 serve to filter out the higher order diffraction components due to the electrode grid structure of the LCTV screen.

17. Lens L4 Fourier transforms the coherent image.

18. At the film plate F the Fourier transformed image is allowed to interfere with the reference beam from M3, thereby making a Fourier transform hologram; called a matched filter.

19. The film F is then darkroom developed using standard techniques. A plurality of plates of film may be created for different targets and or for different angles of a single target.

20. The developed film plate is then placed back in the system and the beam block 50 is used to block the reference beam which is no longer needed. The developed plate selected, of course depends upon the field conditions.

21. If the scene now displayed on the LCTV exactly matches the scene stored on the matched filter F, the reference beam will be recreated and sent through lens L5 to camera 150. This recreated beam corresponds to the correlation of the scene with the matched filter. The system will also have an output signal if enough of the scene matches the filter such as a tank at a slightly different angle or constructed slightly different than the one in the film.

22. The correlation signal (if it exists) can be detected using a television camera 150 and displayed on a monitor 152 after passing through an image digitizer: Colorado Video 151.

23. If the scene dislay changes so that it does not match the matched filter, no signal is detected.

24. The correlation signal displayed on the TV monitor will move as the scene moves on the LCTV screen. Thus the system acts as a tracker as well as a target discriminator. The pointing direction of device 59 feeding input video to the LCTV may be changed to reachieve a correlation signal as the tank (target) moves. The achievement of correlating can be used to fire a fast weapon (not shown) such as a laser at the exact time it is aligned with the target. An output to a trigger 154 is provided for this function.

EXPERIMENTAL RESULTS OBTAINED USING THE INVENTION

Figure 4:
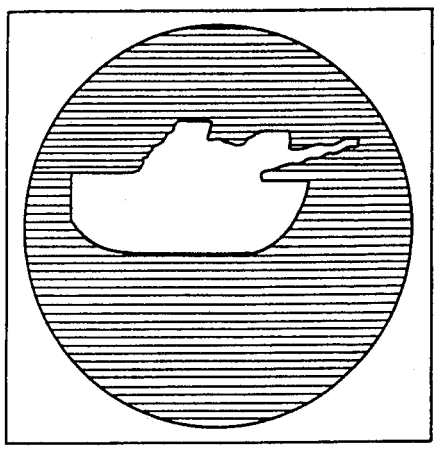
FIG. 4 is an illustration of an image utilizing the present invention.

The photograph of FIG. 4 is an example of the coherent images produced, by the LCTV, in HeNe laser light. The photograph was taken with the 1 mm prefiltering pinhole in the system. Adjusting the brightness control and the automatic gain control of the LCTV produced images in laser light having contrast ratios of 16-20 to 1. It is observed that the LCTV is not perfectly effective in rotating the polarization of the incident polarization by 90° (with no power or no image on the device). Regardless of the orientation of the incident polarization and the analyzer, a perfect null in the intensity transmitted by the analzer could not be found. This may be due to some of the mass construction techniques used in producing the LCTV or perhaps a local distortion of the liquid crystal layer near the electrode grid structure elements. This effect caused the contrast ratio in the coherent image to be considerably lower than images produced by the other light modulators mentioned previously. The observed LCTV contrast ratio was, however, adequate for the experiments discussed in this patent disclosure.

The matched filters were made using well established techniques. The holographic plates (Kodak 649F), were exposed to the filtered Fourier transform of the coherent LCTV image and a reference beam derived from the original collimated laser output. The reference to object beam ratio was varied so as to produce the highest diffraction efficiency for the low spatial frequencies contained in the image. The intensity of the reference beam was varied using a pair of crossed polarizers to obtain the desired beam ratio. The exposure times were chosen between 0.25 and 1.5 second.

Figure 3:
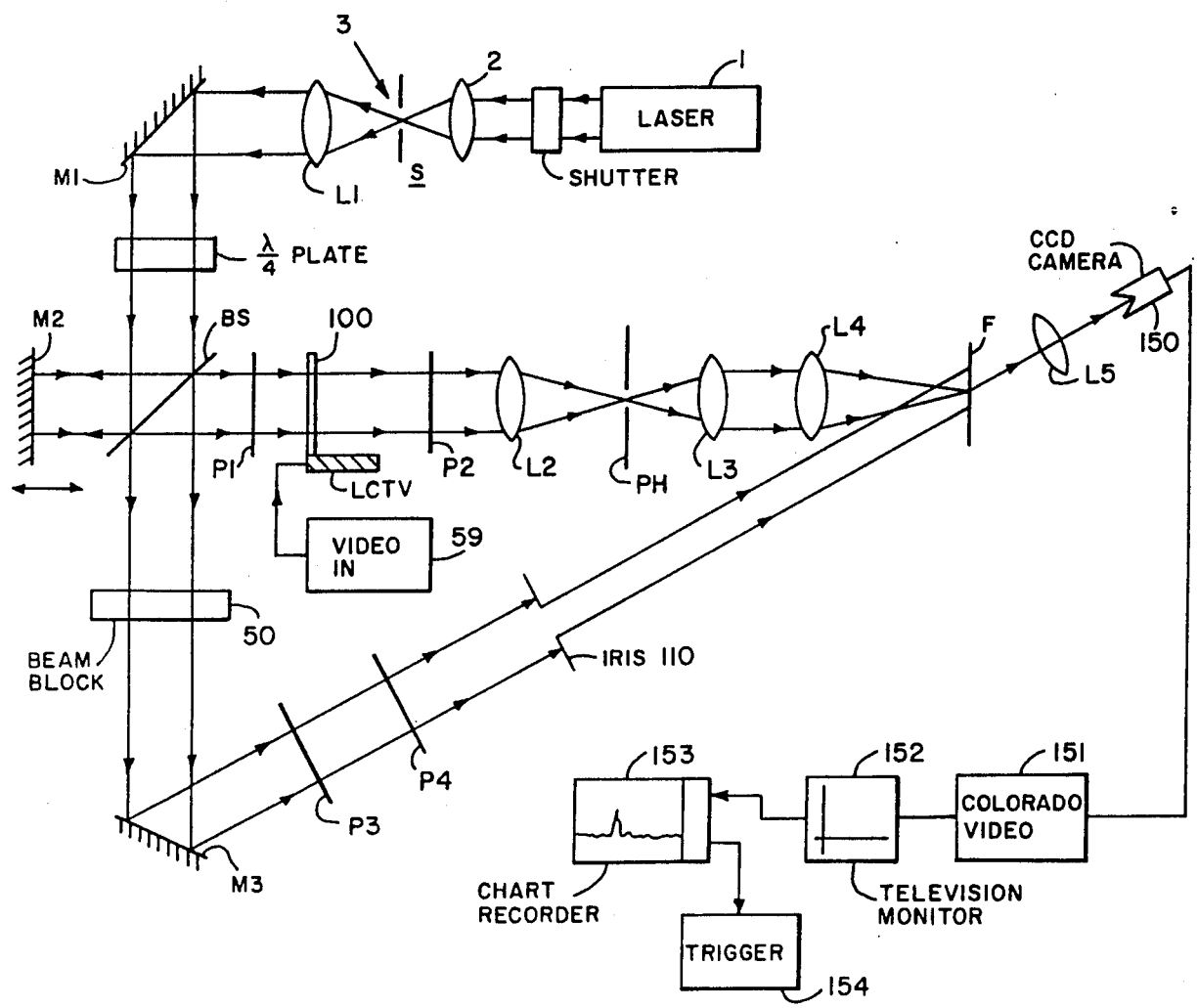
FIG. 3 is a block diagram illustrating the preferred invention.
Figure 5:
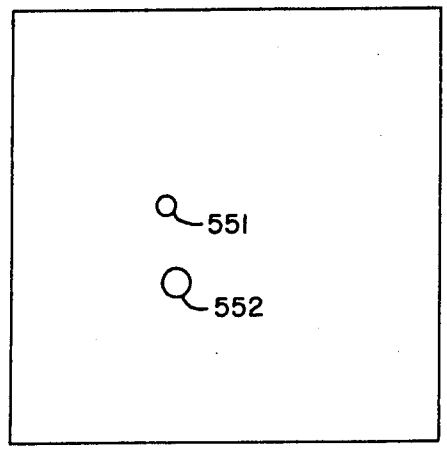
FIG. 5 is an illustration of the television monitor displaying the correlation signals.
Figure 6:
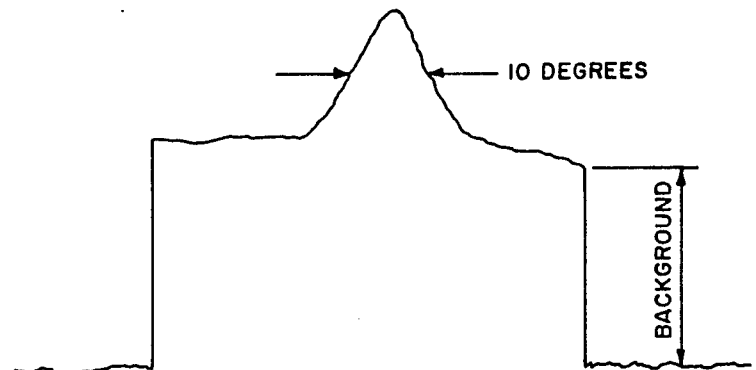
FIG. 6 is a graph showing the correlation intensity verses rotation of the input scene.

An interesting problem was observed during the course of this investigation. For any pinhole/beam ratio/exposure time combination tested, the correlation signal detected by the CCD television camera shown in FIG. 3, was composed of two intensities superimposed. It was found that one of the signals 551 was due to the LCTV pixel screen structure or surface phase variations and the other 552 due to the screen being displayed on the LCTV. This was determined by translating the input scene. The signal corresponding to the scene moved on the television monitor used to observe the correlation signals. This is a well known property of this type of optical correlator. The signal corresponding to the LCTV structure did not move. This is illustrated in the photograph of FIG. 5. This phenomena has been observed in work with a holographic lens used as the Fourier transform lens. Structure within the hololens produced a background correlation signal very similar to that observed here. FIG. 6 illustrates the relative intensities of these two signals for a typical correlation. The input scene was a scale model of an M48 tank. The background signal remained reasonably constant regardless of the variations made in the input scene and the correlation signal due to the scene was always highly visible above the background as the input scene was rotated. The quantity of background signal was strongly dependent upon the focal length of the lens and the diameter of the pinhole used in the prefiltering arrangement. This background would not be present if the LCTV was only used to provide the input to matched filters made using other modulators such as the LCLV.

Figure 7:
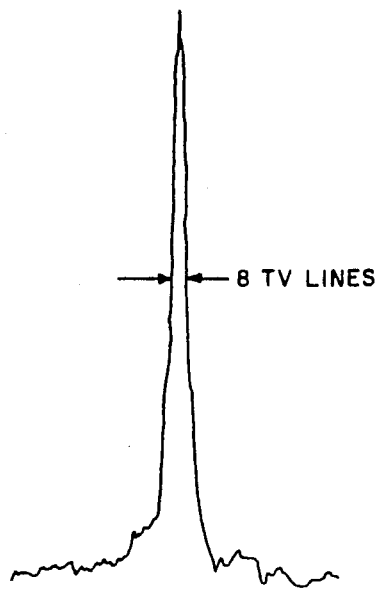
FIG. 7 is a graph showing the spatial distribution of the correlation signal.

FIG. 6 also illustrate the normal loss in scene correlation signal as the input scene was rotated. The correlation signals due to the scene and the LCTV are superimposed. The width of the correlation curve is somewhat larger than that obtained using an LCLV in the correlator and a similar input image. This likely is due to the lower resolution of the LCTV. The spatial distribution of the correlation signal is given in FIG. 7. This data was taken using the TV line sweep capability of the Colorado Video image digitizer.

In this disclosure, it has been shown that small inexpensive liquid crystal televisions may be used as spatial light modulators in some real-time optical pattern recognition applications. The LCTV used in this research was modified by the removal of the original polarizers used on the device. These polarizers were replaced with external, high quality polarizers, and it was found that the contrast of the resulting coherent (HeNe laser) image was greatly improved. This improvement in contrast was enough to investigate the possibility of using the LCTV as a real-time spatial light modulator. Initial results show that the LCTV performs reasonably well in a standard coherent optical recognition correlator and that the device may be used as a replacement for expensive modulators in many general optical data processing applications. Higher resolution televisions of this type, having better optical components, will soon be available which will make this invention even more suitable for target or pattern recognition applications.

We claim:

1. A system comprising a laser producing a laser beam, first means for splitting said laser beam into first and second parts, a liquid crystal television having a screen, a lens, input means connected to said television so as to cause a scene to be depicted on said screen, said screen positioned such that the first part of said laser beam will pass through said screen and be modulated by the scene thereon, and be transformed by said lens, film means being positioned so as to receive said first part of said laser beam after it passes through said screen, and said second part of said laser beam being directed towards said film means by a path which does not pass through said TV screen so as to act as a reference beam, whereby said film means will produce a holograph of said scene on said TV screen.

2. A system as set forth in claim 1 further comprising a first lens system having a pinhole construction so as to filter out higher orders of diffraction components due to electrode grid structure of the liquid crystal television screen, and said lens system being interposed between said screen and said film so as to perform its filtering functions.

3. A system as set forth in claim 2 wherein said film means is replaced with a developed hologram, blocking means located in the second part of said laser beams so as to selectively pass or block said second part of said laser beam, activating said blocking means to block said second part of said laser beam, said input to said TV being supplied so as to be compared with the information on said film means, and detecting means located relative to said film means for detecting when said input to said TV is the same as the information in said film means.

4. A system as set forth in claim 3 wherein better quality first and second polarizer are provided on either side of said screen so as to improve the image.

* * * * *